United States Patent [19]
Sisak

[11] 3,942,691
[45] Mar. 9, 1976

[54] ENCLOSED GUN LOCK

[76] Inventor: David J. Sisak, 317 Idaho St., Portage, Mich. 49081

[22] Filed: Feb. 4, 1974

[21] Appl. No.: 439,312

[52] U.S. Cl.............. 224/1 R; 224/29 D; 312/207
[51] Int. Cl.².................................... B60R 11/00
[58] Field of Search....... 224/1 R, 42.45 B, 42.46 B, 224/42.1 C, 29 R, 29 D, 2 A, 42.1 R; 211/64, 4, 60 R, 60 T, 60 SK; 70/241, 264, 159; 180/114; 312/207, 284, 206, 270; 297/188; 206/317

[56] References Cited
UNITED STATES PATENTS

| | | | |
|---|---|---|---|
| 1,585,551 | 5/1926 | Katz | 224/42.46 B |
| 2,035,895 | 3/1936 | Kelly | 70/159 UX |
| 3,326,385 | 6/1967 | Pinkerton et al. | 211/64 X |
| 3,419,728 | 12/1968 | Wilson | 211/4 X |
| 3,802,612 | 4/1974 | Smith | 224/1 R |

FOREIGN PATENTS OR APPLICATIONS

| | | | |
|---|---|---|---|
| 444,073 | 5/1912 | France | 211/4 |
| 97,329 | 7/1897 | Germany | 224/2 C |

Primary Examiner—Robert J. Spar
Assistant Examiner—Jerold M. Forsberg
Attorney, Agent, or Firm—Woodhams, Blanchard and Flynn

[57] ABSTRACT

An improved gun lock for permitting a gun, particularly a shotgun, to be positioned within the passenger compartment of a vehicle, specifically a law enforcement vehicle. The gun lock includes a protective closable housing which surrounds the barrel and trigger mechanism of the gun for preventing unauthorized access to same. The housing has a cover which is spring urged into an open position. The cover is normally maintained in a closed position by a locking device which can be electrically actuated to release the cover only when the vehicle ignition switch is in the "on" or "accessory" positions. Upon release of the lock device, the spring automatically opens the cover, so that the shotgun is accessible only to those authorized persons having the vehicle ignition key.

12 Claims, 9 Drawing Figures

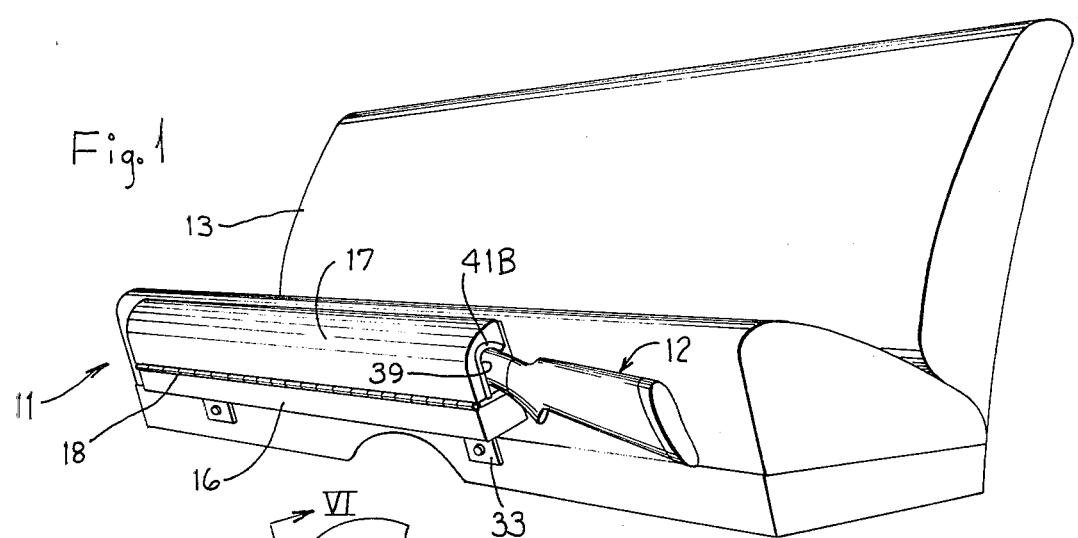
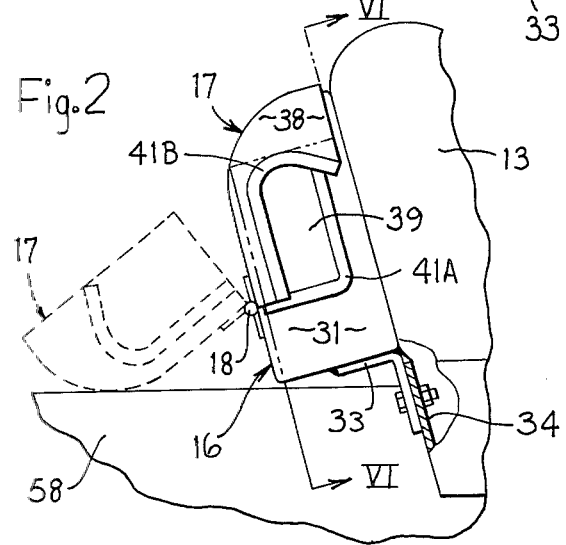
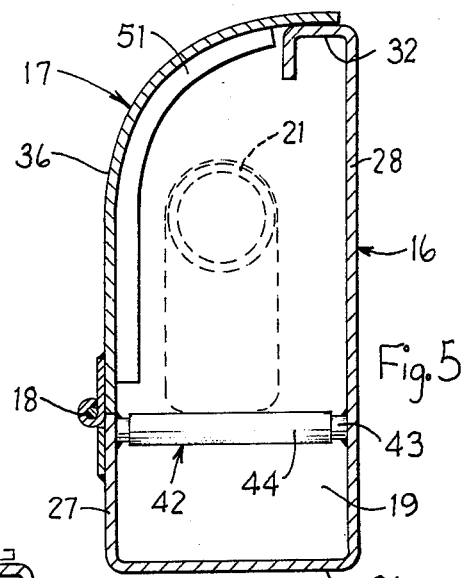
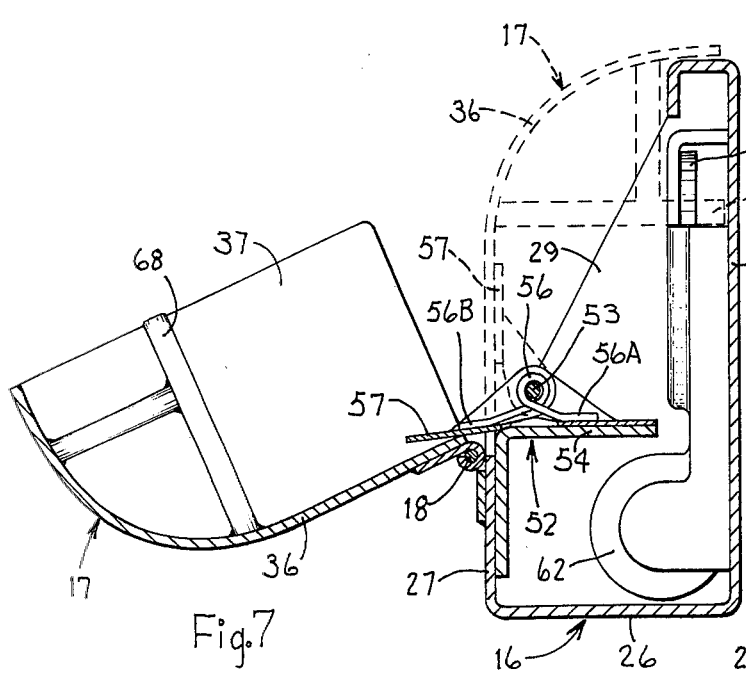
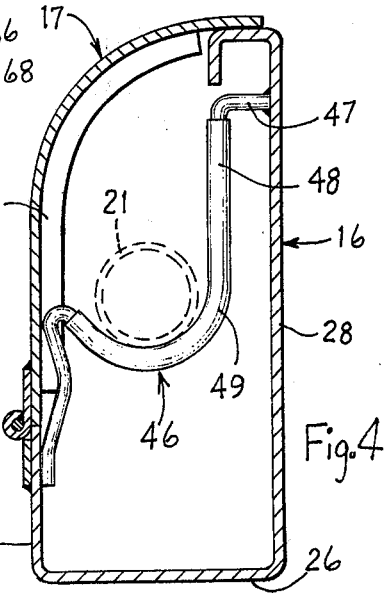

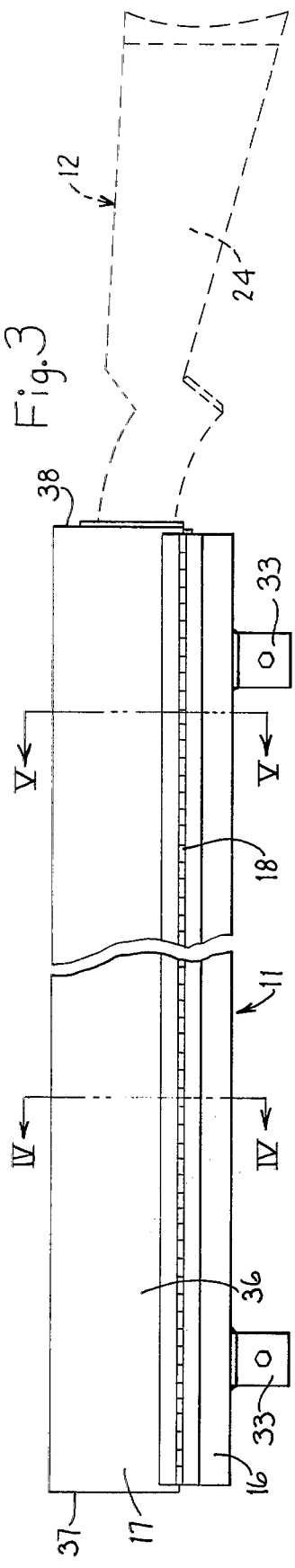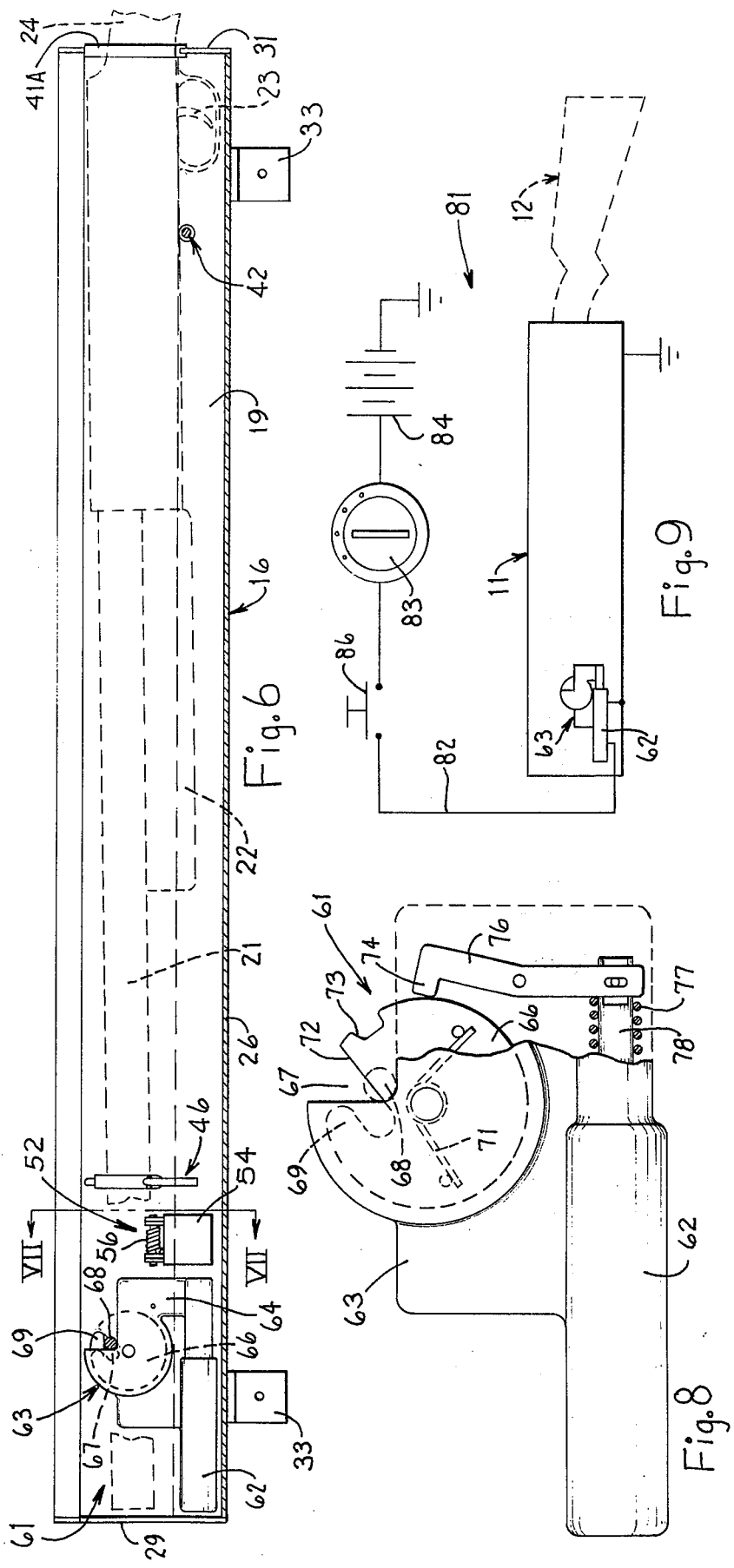

ENCLOSED GUN LOCK

FIELD OF THE INVENTION

This invention relates to a device for mounting and locking a gun, specifically a shotgun, and in particular relates to an improved device which totally encloses at least the barrel and trigger mechanism of the gun when the gun is in a locked position for preventing unauthorized access to the gun and for preventing accidental discharge of the gun due to accidental release of the trigger mechanism.

BACKGROUND OF THE INVENTION

Most law enforcement vehicles used by city, county and state police departments contain a shotgun which is available for the use of the police officer. However, the storage location of the shotgun has presented a continuing problem since the gun should be readily available for the officer's use when needed, but at the same time the gun should not be so readily available as to permit its theft or unauthorized removal from the vehicle. Because of these latter considerations, many law enforcement agencies require that the shotgun be carried in the trunk of the vehicle since this is considered to be the only safe location so as to prevent theft or unauthorized removal of the shotgun. While storing the shotgun in the trunk does eliminate theft and unauthorized removal, nevertheless this storage location is often undesirable inasmuch as it requires substantial time and effort on the part of the officer in order to gain access to the shotgun when use thereof is desired. This obviously presents a serious disadvantage, particularly in those emergency situations where the shotgun is needed immediately. Also, in some situations it may be difficult to gain access to the trunk, and thus the officer is denied the availability of the shotgun.

Further, due to the moisture and temperature variations often encountered in a vehicle trunk, the shotgun is normally stored within a separate carrying case or the like. This thus still further complicates the prompt and efficient utilization of the shotgun.

To overcome the obvious disadvantages associated with the storage of a shotgun within the trunk, attempts have been made to carry the shotgun within the passenger compartment of the vehicle. However, the carrying of the shotgun within the passenger compartment, without securely locking same to the vehicle, is obviously undesirable since the shotgun can be easily stolen or removed from the vehicle. Further, the availability of the gun within the car creates a risk for the officer in those instances when other persons are being transported in the vehicle.

To permit a relatively safe storage of a shotgun within the passenger compartment of a vehicle, to the best of my knowledge there is presently available only one type of gun mount which permits the shotgun to be locked within the passenger compartment. This known mount, which is commonly referred to as the standard vertical collar lock, consists of a bootplate which is positioned on the floor of the passenger compartment so as to engage the butt end of the gun, and a releasable locking collar which is mounted on the dashboard of the vehicle, which locking collar engages the shotgun in the vicinity of the slide. This known mount lockingly maintains the shotgun in a vertical or upright position directly adjacent the dashboard, whereupon the barrel of the gun projects above the dashboard and is readily visible through the windshield of the vehicle. One of the primary objections to this vertical collar lock is the fact that the gun is readily visible at all times to persons located outside the vehicle. This visibility, from a political and psychological standpoint, has been considered undesirable. A further disadvantage of this known vertical collar lock is that it leaves the trigger mechanism totally exposed. While the collar prevents loading of the gun when it is mounted in the collar, nevertheless if the gun is positioned within the collar while still containing a cartridge within the chamber, any accidental release of the trigger mechanism can cause discharge of the gun. The vertical mounting of the shotgun is also undesirable since it presents a potential safety hazard relative to the occupants of the vehicle, particularly if the vehicle should become involved in an accident. This known vertical gun mount also provides no protection for the gun since the barrel and trigger mechanism are totally exposed, whereby the gun must be removed from the collar and cleaned almost daily to prevent the accumulation of dust and dirt within the barrel.

Accordingly, it is an object of the present invention to provide an improved gun mount for permitting a shotgun or rifle to be safely and securely mounted within the passenger compartment of the vehicle, which gun mount overcomes the numerous abovementioned disadvantages. Particularly, it is an object of the present invention to provide:

1. An improved mount for a shotgun, as aforesaid, which can be positioned in the passenger compartment of a vehicle and which permits the gun to be securely locked to prevent theft or unauthorized removal of same from the vehicle.

2. A gun mount, as aforesaid, which can be positioned in the passenger compartment in a relatively unnoticeable manner to thus minimize visibility of the shotgun from the exterior of the vehicle.

3. A gun mount, as aforesaid, which totally encloses the barrel and trigger mechanism to thus eliminate the possibility of any accidental discharge of the gun while also maintaining the gun clean during periods of storage.

4. A gun mount, as aforesaid, which can be positioned in the vehicle so as to not create any hazard or danger to the vehicle occupants, such as might occur during an accident or a collision.

5. A gun mount, as aforesaid, which is particularly suitable for mounting directly along the front seat of the vehicle under the legs of the vehicle occupants, whereby the gun is readily accessible.

6. A gun mount, as aforesaid, which can be easily mounted on any conventional vehicle in an efficient manner without requiring major modifications of the vehicle or of the interior structure thereof.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a perspective view of the enclosed gun lock of the present invention, as mounted on the front side of a vehicle seat.

FIG. 2 is an end elevational view taken from the right side of FIG. 1.

FIG. 3 is a broken front elevational view of the gun lock in a closed position.

FIG. 4 is a sectional view taken along line IV—IV in FIG. 3.

FIG. 5 is a sectional view taken along line V—V in FIG. 3.

FIG. 6 is a view taken along line VI—VI in FIG. 2 and illustrating the interior of the gun lock.

FIG. 7 is a sectional view taken along line VII—VII in FIG. 6 and illustrating the cover in its open position.

FIG. 8 is a fragmentary view of the latching device.

FIG. 9 is a diagram of the electrical circuit associated with the gun lock for controlling the unlocking thereof.

The words "front" and "rear" will refer to the left and right sides, respectively, of the gun lock as appearing in FIGS. 6 and 7. The words "inwardly" and "outwardly" will refer to directions toward and away from, respectively, the geometric center of the device and designated parts thereof.

SUMMARY OF THE INVENTION

The objects and purposes of the present invention are met by providing an enclosed gun lock which comprises an elongated mount or housing having an elongated cover which is normally spring urged into an open position. The cover is maintained in a closed position by a latching device. The shotgun is positionable within the gun lock so that the barrel and trigger mechanism are positioned within the housing, with only the butt of the shotgun extending outwardly from one end of the housing. The latch device is moved into a release position by an electrical solenoid which is connected to a manual switch, which in turn is connected to the vehicle ignition switch, whereby the cover can be opened by closing the manual switch only when the vehicle ignition switch is in an activated position, such as the "on" or "accessory" position.

DETAILED DESCRIPTION

FIG. 1 illustrates therein an enclosed gun lock 11 according to the present invention, which gun lock is adapted to have a gun, specifically a shotgun 12, lockingly enclosed therein. The gun lock 11 is, in a preferred embodiment, mounted along the front side of a vehicle seat 13.

The gun lock 11 includes an elongated boxlike housing or mount 16 which opens upwardly and outwardly. Housing 16 has an elongated cover 17 mounted thereon, as by a hinge 18, for swinging movement thereof about a substantially horizontal axis so that the cover is movable between open and closed positions as illustrated in FIGS. 2 and 7. The housing 16 and cover 17 define therebetween a closed storage compartment 19 in which is positionable a major portion of the shotgun 13. As illustrated in FIG. 6, the barrel 21, slide 22 and trigger mechanism 23 of the shotgun are positionable within the compartment 19, with a majority of the butt 24 projecting outwardly from one end of the gun lock 11.

Considering now the housing 16, same includes a bottom wall 26 which has the opposite edges thereof fixedly secured to front and rear walls 27 and 28, respectively, which walls project upwardly in substantially parallel relationship to one another. The walls 26, 27 and 28 are interconnected at one end thereof by a first end wall 29, and are also interconnected adjacent the other end thereof by a further end wall 31. A pair of mounting brackets 33 are fixedly secured to the housing 16, particularly to the bottom wall 26 in the illustrated embodiment, which mounting brackets 33 are in turn fixedly secured to a frame member 34 which runs longitudinally along the front side of the vehicle seat.

The cover 17, which closes the upwardly and sidewardly extending opening defined between the front and rear walls 27 and 28, is provided with an elongated wall portions 36 which is of an arcuate configuration when viewed in cross section as illustrated in FIGS. 4 and 5. The wall portion 36 extends throughout the complete length of the housing 16 and has the lower longitudinally extending edge thereof connected by the hinge 18 to the upper edge of the wall 27. The other longitudinally extending edge of the wall portion 36, is adapted to overlap the inwardly extending flange 32 formed on the upper free edge of the rear wall 28 to insure a secure closing of the gun lock 11 when the cover 17 is in the closed position. The cover 17 also has end walls 37 and 38 which are fixed to the opposite ends of the wall portion 36, which end walls 37 and 38 are positioned closely adjacent and overlap the end walls 29 and 31, respectively, when the cover is in its closed position. The housing 16 and cover 17 result in the compartment 19 being totally closed except for an opening 39 formed between the cooperating end walls 31 and 38, which opening 39 enables the butt 24 of the shotgun to project outwardly from the gun lock. The opening 39 is formed by opposed notches or recesses formed in the end walls 31 and 38, which recesses form the opening 39 when the cover is in its closed position. The edges of the recesses are bordered by elastomeric cushioning strips 41A and 41B, which cushioning strips surround the opening 39 to permit a snug and secure engagement with the butt of the shotgun for holding same.

To support the shotgun within the compartment 19, the housing 16 is provided with a first hanger or support device 42 (FIG. 5) associated therewith. The hanger 42 comprises an elongated rigid rod 43 which is fixedly secured to and extends between the front and rear walls 27 and 28 in spaced relationship from the bottom wall 26. The rod 43 is preferably provided with a protective covering 44 thereon, which covering may be an elastomeric or plastic coating or sleeve.

The housing 16 has a second hanger or support device 46 (FIG. 4) mounted thereon, which device 46 also includes a rigid rod 47 extending between and fixedly connected to the front and rear walls 27 and 28, respectively. The rod 47 has an intermediate arcuate or cradle-shaped portion 49. The rod 47 is also preferably provided with a protective covering 48 thereon, which covering may comprise an elastomeric or plastic coating or sleeve.

As illustrated in FIGS. 4–6, the hanger devices 42 and 46 are spaced a substantial distance apart in the longitudinal direction of the gun lock, with the hanger 42 being disposed close to but spaced from the end wall 31 so that the hanger 42 will thus supportingly engage the shotgun directly ahead of the trigger mechanism 23. The other hanger device 46 is spaced more closely adjacent the other end of the housing 16 and is positioned so that the arcuate portion 49 thereof supports the gun barrel 21.

To insure the complete protection of the shotgun when same is mounted within the gun lock 11, the housing 17 is preferably provided with several strips 51 of cushioning material, such as elastomeric or plastic foam, positioned at longitudinally spaced locations along the inner surface of the wall portion 36.

The cover 17 is also provided with a spring device 52 (FIGS. 6 and 7) for causing the cover to be continuously resiliently urged towards its open position. The spring device 52 includes a support shaft or pin 53 fixedly secured to a U-shaped bracket 54, which bracket 54 is fixedly secured to the front wall 27 of the housing 16. A torsion spring 56 is wound around the pin 53 and has one leg 56A thereof disposed in engagement with the bracket 54, and has the other leg 56B thereof disposed in engagement with a hinge plate 57 which bears against the wall portion 36 of the cover 17. The spring 56 normally urges the cover 17 to swing outwardly from its closed position (as illustrated in solid lines in FIG. 2) towards its open position (as illustrated by dotted lines in FIG. 2). The cover 17, when in the open position illustrated in FIG. 2, normally engages the drive shaft tunnel 58 which extends longitudinally through the central portion of the passenger compartment.

To permit the cover 17 to be lockingly engaged with the housing 16, there is provided a lock mechanism 61 (FIGS. 6 and 8) for securely locking the cover in its closed position, which lock mechanism 61 permits quick release of the cover only when a proper electrical signal is received via the vehicle ignition switch. The lock mechanism includes an actuator 62 and a latch device 63, both of which are mounted on the housing 16. The latch device 63 includes a stationary housing 64 which pivotally supports a rotary latch member 66. The latch member 66 has a slot 67 therein which is adapted to receive therein the free end of a latch pin 68, which pin 68 is fixedly secured to the inside of the cover 17 as illustrated in FIG. 7. The latch pin 68 when disposed within the slot 67 causes the rotary latch member 66 to be angularly displaced (clockwise in FIG. 6) so that a latching finger 69 formed on the latch member 66 overlaps the pin 68 and prevents same from swinging upwardly out of the slot.

The rotary latch member 66 is normally urged by a spring 71 into the position illustrated in FIG. 8, so that the slot 67 opens upwardly to permit release of the latch pin 68. However, when the cover is closed, the pin 68 engages the sidewall 72 of the slot 67 and cams the latch member 66 downwardly (clockwise in FIG. 8) so that the notch 73 is moved downwardly until the detent 74 associated with the lever 76 is urged, as by the spring 77, to enter into the notch 73, thus locking the latch member 66 in a holding position wherein the latch pin 68 is confined within the slot 67 and is prevented from moving upwardly. When release of the latch pin 68 is desired, then the actuator 62 is activated, which actuator preferably comprises a conventional electrical solenoid having a linearly movable plunger 78. Energization of solenoid 62 causes the plunger 78 to be moved (leftwardly in FIG. 8) in opposition to the urging of the spring 77, thereby withdrawing the detent 74 from the notch 73, whereby spring 71 urges the latch member 66 towards its open position (counterclockwise in FIG. 8) so as to release the latch pin 68. This rotary movement of the latch member 66 towards its open position, coupled with the biasing effect created by the spring device 52, results in the cover 17 being automatically swung into its open position as soon as the solenoid 62 is energized so as to release the latching member 66 from its locking position.

The solenoid 62 is activated and controlled by a suitable circuit 81, one embodiment of which is illustrated in FIG. 9. The coil associated with the solenoid 62 is connected to an electrical conductor 82, which conductor is connected to selected positions of a conventional vehicle ignition switch 83. The ignition switch in turn is connected to a vehicle battery 84 in a conventional manner. The conductor 82 is preferably connected only to the "on" and "accessory" positions of the ignition switch 83, which positions are energized only when a key is inserted into the ignition switch in a conventional manner. The conductor 82 cannot be energized when the ignition switch is in its "off" position, and thus unauthorized persons will not be able to activate the solenoid 62. The conductor 82 also has a manually operable switch 86 associated therewith, which switch normally comprises a conventional push button which is mounted on the vehicle dashboard and is normally maintained in an open position. The solenoid 62 can thus be energized only by momentarily depressing the switch 86 onto its "on" position while simultaneously having the vehicle ignition switch in either its "on" or "accessory" positions.

OPERATION

It will first be assumed that the shotgun 12 is positioned within the gun lock 11, and that the cover 17 is in its closed and locked position as illustrated in FIG. 1. If removal of the shotgun is desired, then the gun can be removed from the gun lock only be depressing the switch 86 while the vehicle ignition 83 is in either its "on" or "accessory" positions, which positions both require insertion of the key into the ignition switch. If the ignition switch is not in either of these positions, then the conductor 82 is de-energized and accordingly depression of the switch 86 has no effect.

Upon energization of the solenoid 62, the plunger 78 moves leftwardly in FIG. 8 and retracts the detent 74 from the notch 73, whereupon spring 71 moves the latch member 66 towards its released position as illustrated by solid lines in FIG. 8. This thus releases the latch pin 68 from the slot 67, whereupon the spring device 52 automatically swings the cover 17 into the open position illustrated by dotted lines in FIG. 2. In this open position of the cover, the officer can then grasp the shotgun and lift same upwardly out of the housing 16. The gun is thus readily available for use by the officer without requiring the officer to leave his vehicle.

When the gun is repositioned within the gun mount, it is positioned on the hanger 42 and 46 with the forward end of the butt 24 engaging the cushioning strip 41A provided on the end wall 31. With the gun so positioned, the cover 17 is then manually swung upwardly toward its closed position. When the cover approaches its closed position, the latching pin 68 engages the sidewall 72 of the slot 67 and cams the latch member 66 downwardly until the detent 74 is again urged by the spring 77 into the notch 73. This thus results in the latch member 66 being held in a position wherein the latching finger 69 extends over the latch pin 68 and prevents same from being moved upwardly. In this position, the cover 17 is securely held in a closed and locked relationship with respect to the housing 16 so that the gun can again be removed from the gun lock 11 only by again energizing the solenoid 62.

The gun lock of the present invention is highly desirable since the barrel, slide and trigger mechanism are totally enclosed and protected, and can accordingly not be accidentally contacted. This thus eliminates the possibility of accidental discharge of the gun in the event that same is stored in a loaded condition. Further, the housing 16 and cover 17 are preferably made from relatively heavy sheet steel so that the gun lock is not only durable, but is also safe so that any accidental discharge of the gun within the gun lock will not cause any damage or injury. The gun lock 11 is also preferably provided with a package of silica gel or other suitable product therein so as to absorb moisture within the gun lock, thereby preventing collection of moisture on the gun.

The gun lock 11 of the present invention is preferably mounted on the lower front side of the vehicle seat, as illustrated in FIG. 1, since this position of the gun within the vehicle makes same relatively unnoticeable to persons positioned exteriorly of the vehicle. However, it will be appreciated that the gun lock can be securely mounted within the passenger compartment at numerous other locations if so desired. The position disclosed in FIG. 1 is highly desirable, however, since the shotgun is readily available to the officer without having to leave the vehicle seat and, in fact, is available to the officer even while lying on the seat.

The lock device 61 may deviate substantially from the disclosed structure since it will be recognized that numerous latching mechanisms could be provided so as to perform the same function disclosed above.

It will be appreciated that the gun lock 11 of the present invention could also be provided with a separate key lock for locking the cover 17 to the housing 16, which key lock would take the place of the solenoid-controlled latch device 61. However, use of the separate key lock is not as desirable since this would require the officer to carry a separate key and would also require greater effort and time on the part of the officer to permit removal of the shotgun from the gun lock.

The embodiments of the invention in which an exclusive property or privilege is claimed are defined as follows:

1. In a gun mount for storing and locking a gun, the gun mount being adapted for connection to a motor vehicle and having housing means defining therein a substantially closed compartment for storage of the gun barrel, comprising the improvement wherein said housing means is elongated and tubular and defines therein a substantially closed elongated compartment adapted to have positioned therein the barrel and trigger mechanism of a rifle or shotgun, said housing means including an elongated housing member having support means associated therewith for supportingly engaging the gun barrel, said housing means also including elongated cover means extending longitudinally throughout substantially the complete length of said housing member and being hingedly mounted on said housing member for swinging movement about an axis extending substantially parallel to the longitudinal direction of said housing member so that said cover means is swingable between open and closed positions, said cover means when in said closed position coacting with said housing member for defining said closed elongated compartment therebetween, said cover means being substantially L-shaped in cross-section and including first and second wall portions which respectively function as the top wall and at least part of the front wall of the housing means when said cover is in its closed position, said cover means being hinged along the lower edge of said second wall to said housing member so that said cover means swings outwardly and downwardly away from said housing member when swingably moved into its open position, one end of said housing means being closed, the other end of said housing means being defined by end wall means which has opening means therethrough when said cover means is closed, said housing means being free of openings except for said opening means, said end wall means having edge means defining said opening means and disposed so as to closely surround the butt of said gun for maintaining the barrel and trigger mechanism of the gun within said compartment while permitting the butt of said gun to project outwardly from said compartment, and locking means coacting between said housing member and said cover means for fixedly locking said cover means to said housing member when said cover means is in said closed position, whereby said gun can be removed from said housing means only by swingably moving said cover means into its open position.

2. A mount according to claim 1, further including spring means coacting with said cover means for normally resiliently urging same toward said open position.

3. A gun mount according to claim 1, wherein said edge means includes flexible cushioning strips extending around said opening means to create a snug and secure engagement with the butt of the gun.

4. A gun mount according to claim 1, further including key-actuated release means coacting with said locking means for releasing said locking means to permit swinging movement of said cover means into said open position.

5. A mount according to claim 1, further including release means coacting with said locking means for permitting release of said cover means from said housing member, said release means including electrical solenoid means operatively interconnected to said locking means for releasing same whenever said solenoid means is energized.

6. A mount according to claim 5, further including spring means coacting with said cover means for normally resiliently urging same towards said open position.

7. In a gun mount for storing and locking a gun, the gun mount being adapted for connection to a motor vehicle and having housing means defining therein a substantially closed compartment for storage of the gun barrel, comprising the improvement wherein said housing means is elongated and tubular and defines therein a substantially closed elongated compartment adapted to have positioned therein the barrel and trigger mechanism of a rifle or shotgun, said housing means including an elongated housing member having support means associated therewith for supportingly engaging the gun barrel, said housing means also including elongated cover means extending longitudinally throughout substantially the complete length of said housing member and being hingedly mounted on said housing member for swinging movement about an axis extending substantially parallel to the longitudinal direction of said housing member so that said cover means is swingable between open and closed positions, said cover means when in said closed position coacting with said housing member for defining said closed elongated compartment therebetween, one end of said housing means being closed, the other end of said housing means being defined by end wall means which has opening means therethrough when said cover means is closed, said end wall means having edge means defining said opening means and disposed so as to closely surround the butt of said gun for maintaining the barrel and trigger mechanism of the gun within said compartment while permitting the butt of said gun to project outwardly from said compartment, and locking means coacting between said housing member and said cover means for fixedly locking said cover means to said housing member when said cover means is in said closed position, release means coacting with said locking means for permitting release of said cover means from said housing member, said release means being connected to the electrical system of the vehicle and being interconnected to said locking means for releasing the same whenever that particular portion of the electrical system is activated, whereby said gun can be removed from said housing means only by swingably moving said cover means into its open position.

8. The combination according to claim 7, wherein said cover means is substantially L-shaped in cross section and includes a first wall portion which comprises at least a major portion of the front wall of said housing means and a second wall portion which comprises at least a major portion of the top wall of said housing means, whereby a majority of the top and front sides of the housing means are fully uncovered when said cover means is in its open position, and said cover means being hingedly connected to said housing member along the lower edge of said first wall portion so that said cover means swings outwardly and downwardly relative to said housing member when being swingably moved toward said open position.

9. The combination according to claim 7, wherein, said locking means includes cooperating first and second latch members mounted on said housing member and said cover means, respectively, for holding said cover means in said closed position, one of said first and second latch members being mounted on its respective member for movement relative thereto between latching and unlatching positions; and said release means including electrical solenoid means operatively interconnected to said one latch member for releasing same from its latching position.

10. The combination according to claim 9, further including electrical circuitry means operatively connected to said solenoid means for controlling energization thereof, said electrical circuitry means including electrical conductor means operatively connected between said solenoid means and the key-operated vehicle ignition switch, and manually-actuatable switch means associated with said conductor between said solenoid means and said ignition switch, said manually-actuatable switch means being normally maintained in an open position.

11. The combination according to claim 10, further including spring means coacting with said cover means for normally resiliently urging same into said open position.

12. The combination according to claim 7, wherein said vehicle includes a seat structure having a seat portion and a back portion, said seat structure also having frame means positioned under said seat portion; and said housing means being positioned directly adjacent the front side of said seat portion, and securing means fixedly connecting said housing member to said frame means so that said housing means is elongated in a substantially horizontal direction.

* * * * *